May 29, 1956  A. P. ZUBRICKY  2,747,730
HOLDERS FOR TOOLS

Filed Aug. 31, 1951  4 Sheets-Sheet 1

INVENTOR.
Adam P. Zubricky
BY
Parker, Trochman Harmes,
Attorneys.

May 29, 1956

A. P. ZUBRICKY 2,747,730

HOLDERS FOR TOOLS

Filed Aug. 31, 1951

INVENTOR.
Adam P. Zubricky,
BY
Parker, Fruchman Horner,
Attorneys.

May 29, 1956 A. P. ZUBRICKY 2,747,730
HOLDERS FOR TOOLS

Filed Aug. 31, 1951 4 Sheets-Sheet 4

INVENTOR.
Adam P. Zubricky
BY
Parker, Prochnow & Farmer,
Attorneys.

United States Patent Office 2,747,730
Patented May 29, 1956

2,747,730

HOLDERS FOR TOOLS

Adam P. Zubricky, Cheektowaga, N. Y.

Application August 31, 1951, Serial No. 244,586

5 Claims. (Cl. 206—16)

This invention relates to holders for wrench sets or similar tools comprising units of various sizes, for releasably securing the same in fixed relation to each other. These holders are intended particularly for use in connection with tools, at least one of which has openings in the opposite ends thereof.

One of the objects of this invention is to provide a holder for tools which is inexpensive to produce and reliable in its holding action.

A further object is to provide a holder of this kind made of a single piece of wire.

Another object is to provide a holder of this type on which a set of tools can be easily and quickly assembled.

Other objects and advantages will be apparent from the following description of one embodiment of the invention and the novel features will be particularly pointed out hereinafter in connection with the appended claims.

In the accompanying drawings, which show by way of example several embodiments of my invention applied to wrenches of different kinds:

Figure 1:
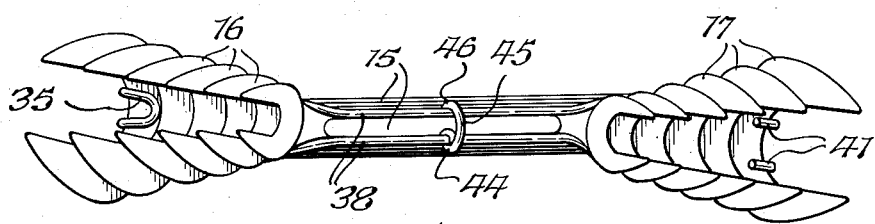
Fig. 1 is a top plan view of a set of open end wrenches having a holder embodying this invention applied thereto.
Figure 2:
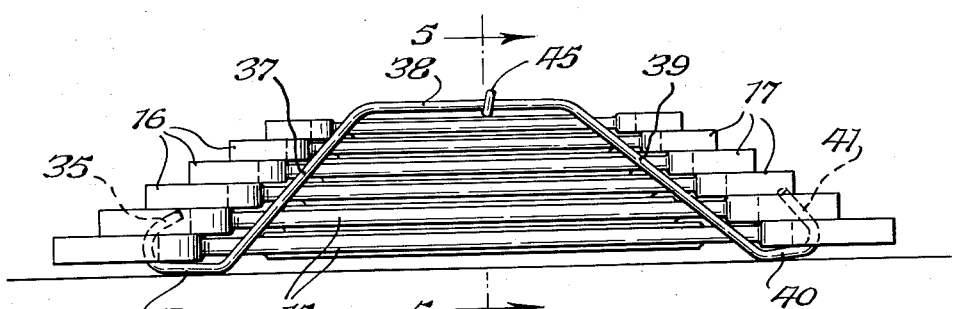
Fig. 2 is a side elevation thereof.
Figure 3:
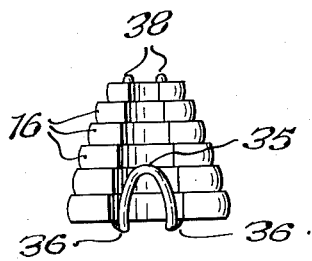
Figs. 3 and 4 are end elevations of the opposite ends of the wrench set and holder shown in Figs. 1 and 2.
Figure 4:
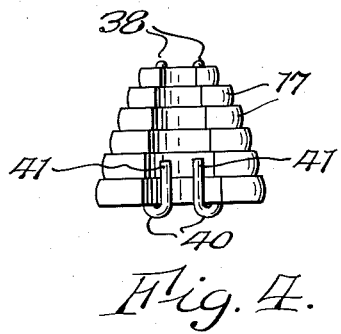
Figure 5:
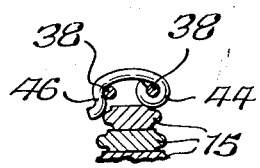
Fig. 5 is a fragmentary, sectional elevation thereof, on line 5—5, Fig. 2.

In the accompanying drawings, I have shown my improved holder applied to wrench sets, but it is not intended to limit this invention for use in connection with wrench sets, since it will be obvious that my improved holders may be used in connection with other tools or implements.

In Figs. 1 to 5, I have shown my holder applied to a set of open end wrenches, each of which has an intermediate handle portion 15 and heads 16 and 17 at opposite ends of the handle portion.

In Figs. 6, 7, 9, 10, 13 and 14 I have shown my holder applied to combination wrenches having intermediate or handle portions 19 and having open-ended heads 20 at one end thereof and box wrench heads 21 at the opposite ends thereof.

Figure 8:
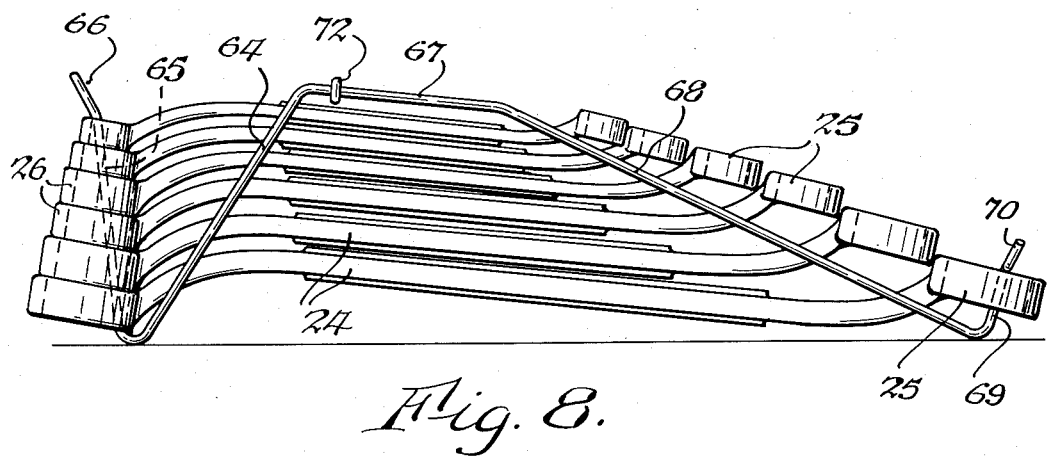
Fig. 8 is a side elevation of a set of box wrenches showing my improved holder applied thereto.

In Fig. 8 the invention is applied to box wrenches in which the handles 24 are provided at opposite ends with box heads 25 and 26.

Figure 11:
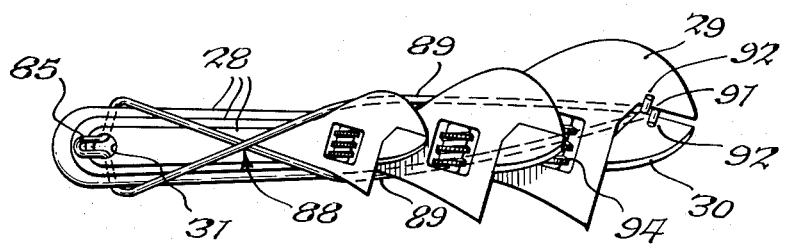
Fig. 11 is a top plan view of a set of adjustable wrenches having a holder embodying my invention applied thereto.
Figure 12:
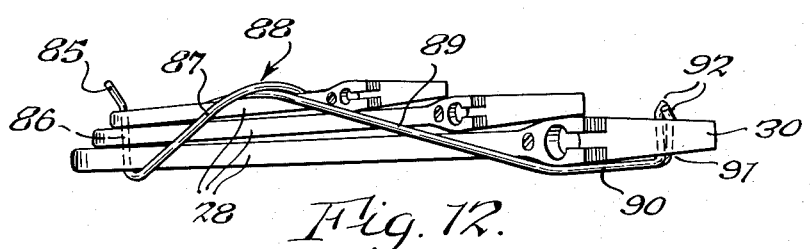
Fig. 12 is a side elevation thereof.

In Figs. 11 and 12 I have shown my invention applied to adjustable wrenches, each having a handle portion 28 provided at one end with a fixed jaw 29 with which a movable jaw 30 cooperates, and the handle portions are provided in the opposite ends thereof with the usual apertures 31, which are generally provided on wrenches of this type.

My improved holder is formed to cooperate with openings in the ends of the tools or wrenches, such for example, as the openings between the jaws of open end wrenches, the openings in the box type of head, or openings in the handles, such as the holes 31 shown in Fig. 11. The holder is preferably made of a single piece of wire which can readily be bent by means of suitable apparatus of the type commonly used for forming wire articles.

In all of the constructions shown, one end of a single piece of wire is bent through about 180 degrees. This bent part then forms one end of the holder and is further bent to form a hook-like portion suitable for engaging the opening in one or more of the wrenches of a set. The other end of the holder, which may comprise one or both ends of the original wire, is also bent to form one or two hook portions suitable for extending through the opening in the opposite end of one or more wrenches of the set for gripping the same. The intermediate portion of the holder is formed to extend along the opposite edges of the handle portions of the wrenches of the set to hold all of the wrenches of the set together in an orderly arrangement one above the other. These sides of the holder may also extend in close proximity to the parts of the heads of the wrenches adjacent to the handles, at one or both ends of the handles to prevent lengthwise shifting of the wrenches relatively to each other. The upper portions of the sides of the holder may be connected in any suitable manner to prevent spreading apart of the sides, for example, by means of a releasable clip, or by crossing over the uppermost or smallest wrench of the set.

Referring particularly to Figs. 1 to 5, the portion of the wire forming the holder is bent approximately midway of its ends through an angle of 180 degrees. This bent part forms one end of the holder and is further bent into a hook-like form 35 which is shaped to extend through an opening in the end of a wrench and engage the head of this wrench. In the particular construction shown, the hook portion 35 is relatively short and engages only with the lower and largest wrench of the set, but it will be obvious that, if desired, this hook can be extended so that it will lie between the jaws of several or all of the wrenches of the set. The hooked part may extend straight up through the opening in a wrench head, or it may be bent over as shown to overlie a part of a wrench head. The hooked part 35 terminates at a horizontally extending part, as indicated at 36, to underlie the lower face of the largest wrench of the set, and the wire is then bent to form upwardly and downwardly extending portions forming the sides of the holder. These sides each include an inclined portion 37 which preferably lies in close proximity to the portions of the heads of the wrenches which adjoin the handle portions 15 thereof. The two halves of the wire then extend substantially parallel to the handle portions of the wrench and above the uppermost or smallest of the set, as indicated at 38. Adjacent to the other head of the uppermost or smallest wrench of the set the two legs of the wire are again bent downwardly at an inclination, as indicated at 39, to lie in close proximity to the heads at the other ends of the wrenches. The end portions of the two legs of the wire are then bent as shown at 40, to underlie the other head of the lowest or largest wrench of the set and are then bent upwardly as indicated at 41, to form hooks extending through the opening in the head 16 of the lowermost or largest wrench of the set, and then backwardly to overlie this head. In addition to the bends made in the wire, which can readily be seen in elevation, the upper portions 38 of the legs of the wire are also bent toward each other, as clearly shown in Fig. 1, to partly overlie the handle of the upper or smallest wrench of the set.

In connection with the production of wrench sets, the cost of the holder as well as the time required to assemble the wrenches of a set in a holder are of importance. The wire from which the holder is made is sufficiently flexible so that the same may be flexed without difficulty, and in applying a holder of the type shown in Figs. 1 to 5, the opposite hooked ends of the holder are first passed through the openings in the opposite ends of the largest wrench and hooked into engagement with the opposite heads of the largest wrench. The two side portions of the holder which engage the edges of the handles of the wrenches can readily be spread apart so that the desired number of wrenches may be positioned between the two sides of the holder so that a wrench set may be very easily and quickly assembled in a holder.

The resiliency of the wire may, if desired, be depended upon to prevent the sides of the holder from spreading apart and permitting the wrenches to drop out of the holder. However, if desired, a fastening device may be provided which connects the upper portions of the holder 38 so as to prevent separation of the sides of the holder. A fastening device of any suitable or desired type may be employed for this purpose, and in the construction shown I have provided a hook-shaped connector or clip which may also be made of wire, one end of which is turned or looped as indicated at 44 to extend about one of the wire parts 38. From this loop a wire of the connector may extend across to the other part 38, as shown at 45, and the other end of the wire is provided with a hooked portion 46 which may engage the other wire part 38 so as to securely hold these parts against separation. In the ordinary use of the holder, it is not generally necessary to connect the two parts 38 by means of a connector or hook, but for transport or shipment, this connector or clip may be found desirable.

Figure 6:
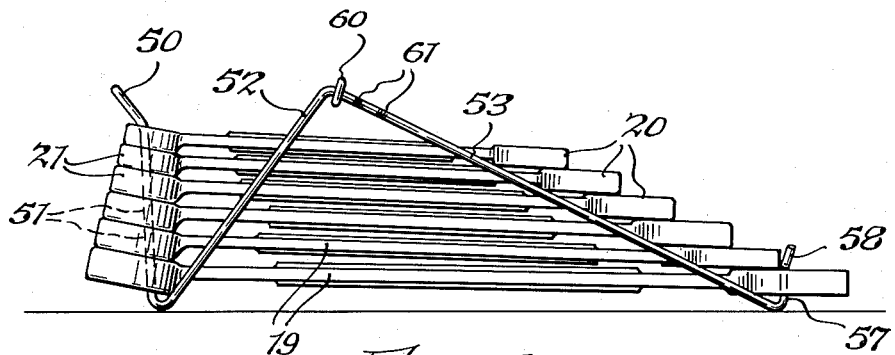
Fig. 6 is a side elevation of a set of combination wrenches having a holder of modified construction applied thereto.
Figure 7:
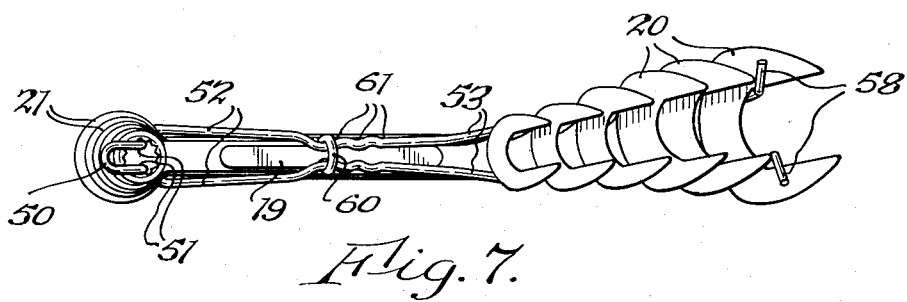
Fig. 7 is a top plan view thereof.

In the construction shown in Figs. 6 and 7, my improved holder is shown for use in connection with combination wrenches, and the holder used for wrench sets of this type is very similar to the one described in Figs. 1 to 5, except that the bent middle portion of the wire from which the holder is made and which constitutes one hooked end of the holder is of sufficient length to extend through the box heads of all of the wrenches of the set, and the end of this hooked portion may, if desired, be offset in either direction, as shown at 50. This hooked portion of the wire is, therefore, bent so that two legs 51 thereof extend substantially parallel to each other. This pair of downwardly extending arms or parts 51 is of sufficient length to extend through all of the openings of the box heads 21 of the wrenches. The part 50 is preferably bent outwardly so as to prevent the upper wrench from moving upwardly out of engagement with the part 50 when the holder is applied to the wrench set. The two legs or parts of the wire are then bent to extend below the head of the lowest or largest wrench of the set and then upwardly at an inclination along opposite sides of the wrench set, as indicated at 52, to a point above the upper or smallest wrench of the set. Since the wrenches of the set are positioned with the smallest wrench uppermost, and since the widths of the handles of the wrenches of the set become smaller from the lowest wrench to the upper wrench, the two parts 52 of the holder converge upwardly as shown in Fig. 7.

At a point above the uppermost wrench, the two legs or parts of the holder are bent downwardly at an inclination as shown at 53 into proximity to the heads 20 of the wrenches. At a point below the head 20 of the lowest wrench, the two legs of the holder are again bent upwardly as shown at 57 to extend through the opening in the lower wrench head and the ends of these legs are bent outwardly as shown at 58 to extend over the upper surfaces of the jaws of the lower wrench head 20, to releasably secure this end of the holder to the lowest wrench. The parts 53 of the holder diverge downwardly in accordance with the increasing widths of the handles of the wrenches. If a fastening device is desired, this device may be in the form of a clip or hook 60 similar to the hook or fastening device described in Figs. 1 to 5. This fastening device is normally located at the intersection of the parts 52 and 53, where these parts approach nearest to each other so that the fastening device may be easily applied to connect the two sides of the holder. If greater tension is desired to press the sides of the holder against the edges of the wrenches the fastening device 60 may be slid along the parts 53 to apply more force to the sides of the holder to press the same against the edges of the wrench handles. If desired, the parts 53 may be provided with slight waves or indentations 61 by means of which the fastening device 60 can be releasably held in a lower position on the diverging parts 53 for applying more tension to the sides of the holder.

In Fig. 8, my holder is shown as applied to a set of box wrenches and this holder is very similar to the one shown in Figs. 6 and 7, being provided at one end with hook parts 65 extending through the openings in the box wrench heads 26 and the extreme end of this part is bent over as shown at 66 to form a stop to prevent dislodging of the wrenches from this part of the holder. The holder is also provided with upwardly extending parts 64 engaging the opposite edges of the wrenches, then with substantially horizontal parts 67 arranged above the uppermost wrench and then with downwardly inclined parts 68 extending in proximity to the heads 25 of the wrenches. The other end of the holder is provided with upwardly extending end portions 69 may be inserted through the opening in the box head 25 of the lowest wrench and which terminate in outwardly bent-over portions 70. Since the first mentioned end portion 65 extending through the openings in the box heads 26 serves to hold the wrenches against excessive movement lengthwise of each other, it is not necessary for the downwardly inclined portions 68 to extend into close proximity to the heads 25 of the wrenches, but if desired, these parts 68 may readily be bent in such a manner as to extend into close proximity to the portions of the heads 25 which are nearest to the handles 24.

The holder shown in Fig. 8 may also be provided with a clip or fastening device 72 operating on the substantially horizontal part 67 of the holder.

It will readily be seen that in the construction shown in Figs. 6 to 8, that the placing of wrenches on the holder can be very quickly and easily effected. The wrenches of a set in order of their size are placed approximately into the positions shown with the parts 51 or 65 passing through the openings in the box heads of the wrenches, so that the handles of the wrenches all lie between the two sides of the holder. The hook portions at the other end of the holder can easily be placed through the opening in the lowest wrench by flexing the wire holder and upon releasing of these ends, they will hold themselves in the positions shown in the head of the lower wrench of the set. By means of the fastening device 60 or 72, the upwardly extending parts 57 or 69 will be urged away from each other so that the overhanging portions 58 or 70 will be securely held in engagement with the head of the lower wrench of the set.

Figure 9:
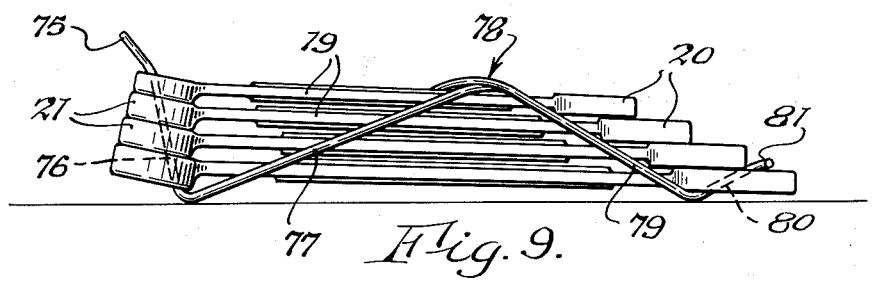
Fig. 9 is a side elevation of a set of wrenches having a holder of modified construction applied thereto.
Figure 10:
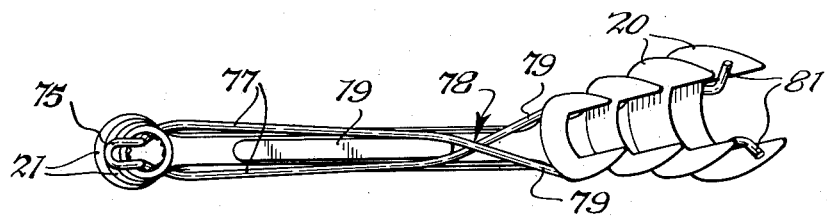
Fig. 10 is a top plan view thereof.

In Figs. 9 and 10, I have shown a wrench holder in which a clip or fastening device may be dispensed with. In this type of holder, which is applicable to any of the types of wrenches shown in the preceding figures, and which is illustrated in Figs. 9 and 10 by way of example as applied to combination wrenches, 75 represents the intermediate bent part of the original wire of which the holder was made, and which is bent as herein described in connection with the other figures to pass through the opening in the heads of the wrenches. The offset portion 75 prevents the wrenches from being lifted upwardly when held in the holder, and terminates at its lower end in hooks 76 which extend through the openings in the box heads of the combination wrenches. The wire of the two legs of the holder is then bent upwardly at an inclination to form the parts 77 arranged at opposite sides of the set of wrenches and extending to the upper surface of the upper wrench. At this point, the two wires are crossed or extend one over the other as shown at 78 and the two legs of the holder are then bent downwardly to form downwardly inclined parts 79. The parts 79 extend downwardly along the opposite sides of the wrench set from the parts 77. The parts 79 terminate at their lower ends in upwardly extending parts 80 and project through the opening in the head 20 of the lowest wrench and are then provided with outwardly extending bends or flaring parts 81 for engaging the jaws of the head 20 of the lower or largest wrench.

In the positioning of the wrenches in this holder, the two legs of the wire may first be spread apart and the heads 21 of the wrenches are then placed so that the end part 76 of the holder extends through the openings in the box heads 21 of the same. The legs are then brought together and crossed over the top of the uppermost wrench and sprung into engagement with the jaw 20 of the lowest wrench of the set. Other methods of assembling the wrenches in the holder may, of course, be employed.

In Figs. 11 and 12 I have shown my improved holder applied to adjustable wrenches arranged in sets. The wire of which the holder is made is bent in its midportion to form the offset end part 85 which may be inserted through the usual holes 31 provided in the outer ends of the handles of the wrenches. The hook part 86 of the holder passes downwardly through the holes 31 of the several wrenches of the set and the two legs of the wire are then bent upwardly forming the parts 87 which cross each other at 88 to opposite sides of the wrench set. The legs of the wire are then bent downwardly to form the parts 89 which terminate in substantially horizontal parts 90 below the head of the lowermost wrench and the parts which originally were the ends of the wire are bent upwardly, as shown at 91, to extend through the opening between the jaws of the lowest wrench of the set and are then bent outwardly, as shown at 92, to engage the upper surfaces of the jaws 29 and 30 of the largest wrench.

In assembling the wrenches in the holder shown in Figs. 11 and 12 the same procedure is followed as explained in connection with Figs. 9 and 10, except that the two jaws 29 and 30 of the lowest adjustable wrench may initially be spread apart by means of the adjusting worm 94 of the lowest wrench and after the hooked portions 92 have been placed between the jaws, these jaws may be closed on the parts 91 of the holder, as shown in Fig. 11, so that a very secure holding of the wrenches in the holder will result.

Adjustable wrenches, such as shown in Figs. 11 and 12 may, of course, be held in sets by means of holders such as shown in the preceding figures, and holders with crossed legs may be used on any of the types of wrenches shown.

The wrenches may be easily removed from the holders by disengaging the hooked parts formed on the free ends of the legs of the holders from the wrench heads with which they engage, whereupon the sides of the holders may be spaced apart to permit easy removal of the wrenches or tools from the holders.

Figure 13:
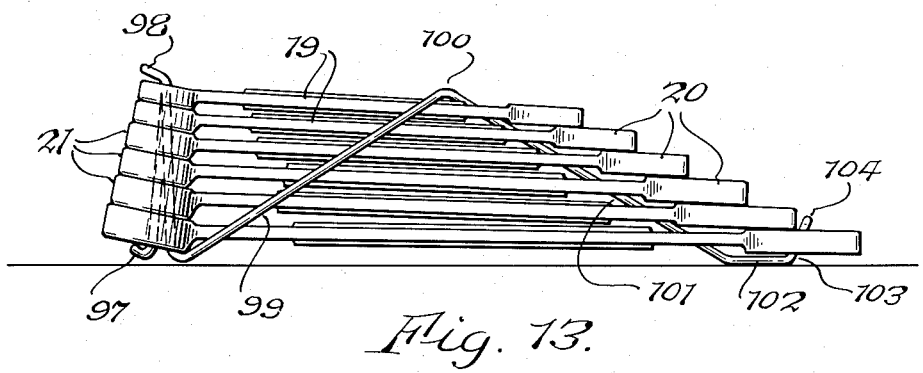
Fig. 13 is a side elevation of a set of wrenches having a holder of another modified construction applied thereto.
Figure 14:
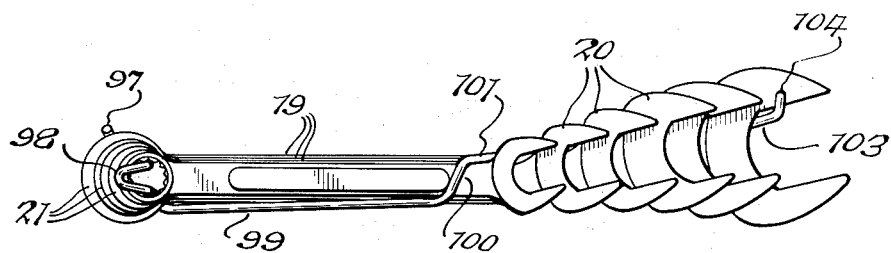
Fig. 14 is a top plan view thereof.

In Figs. 13 and 14 I have shown another type of holder applied to combination wrenches, although it is obvious that this type of holder may be used with other kinds of wrenches. In this construction the holder has only a single wire engaging the edges of the handles of the wrenches. One end of the holder is formed to provide a hooked end part which, in the construction shown, extends through all of the box heads of the wrenches of the set. One end of the wire is turned over to form a part 97 extending partly around the box head of the lowest wrench. The wire then extends upwardly through all of the box heads 21 of the set and then passes downwardly through the wrench heads below the bottom face of the lowest wrench, thus forming a hooked end of the holder. The upper part of the hooked end is bent over as shown at 98 to form a stop to prevent upward movement of the wrenches when assembled in the holder.

At the lower face of the lowest wrench, the wire extends upwardly at an inclination along one of the edges of the wrench handles, as shown at 99. The wire then extends across the upper face of the upper wrench as shown at 100, and then extends downwardly at an inclination along the opposite edge of the handles of the set, as shown at 101. This part of the wire extends in close proximity to the inner edges of the heads 20 of the wrenches to below the head of the lowest wrench of the set, then substantially horizontally as at 102, and then upwardly between the jaws of the lowest wrench, as at 103. The wire then terminates in a hooked part 104 which extends to a limited extent across the upper face of one of the jaws of the head 20 of the lowest wrench. The parts 99 and 101 of the wire serve as the sides of the holder to hold the wrench against sidewise movement and thus hold the heads 21 in engagement with the hooked end of the holder passing through the same.

In assembling the wrenches on the holder, the hooked end formed by the part of the wire which is doubled back on itself is first passed through the openings in the box heads 21. The wire is then flexed so that the side parts 99 and 101 extend along opposite edges of the wrenches, whereupon the hooked part 104 is sprung over a jaw of the lowest wrench. When it is desired to remove the wrenches from the holder, this procedure is reversed.

This holder shown in Figs. 13 and 14 has the advantage that it requires somewhat less wire than those shown in the other figures.

While I have shown my holders as applied only to wrenches, it will be obvious that other tools or implements may be held in sets by means of these holders.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A wrench set including wrenches of gradually decreasing size from the lowest to the uppermost wrench, said wrenches having openings in opposite end portions thereof, and a holder for releasably securing said wrenches in said relation to each other, that improvement in which said holder is made of a single piece of wire having one end thereof bent to form a hook and extending upwardly through all of the openings in one end of said set of wrenches and gripping the uppermost of said wrenches, said wire beyond said hook extending along one side of said wrench set, then across the uppermost wrench and along the other side of said set to the lowest wrench and then upwardly through the opening at the opposite end of the lowest wrench and into gripping engagement therewith.

2. A wrench set including wrenches of gradually decreasing size from the lowest to the uppermost wrench, said wrenches having openings in opposite end portions thereof, and a holder for releasably securing said wrenches in said relation to each other, that improvement in which said holder is made of a single piece of wire having a portion thereof intermediate of its ends bent back on itself to form two substantially parallel parts, said parallel parts being bent to form a hook which passes through the openings at one of the ends of said set of wrenches, said wire beyond said hook extending along one side of said wrench set, then across the uppermost wrench and along the other side of said set to the lowest wrench and then upwardly through the opening at the opposite end of the lowest wrench and into gripping engagement therewith.

3. A wrench set including wrenches of gradually decreasing size from the lowest to the uppermost wrench, said wrenches having openings in opposite end portions thereof, and a holder for releasably securing said wrenches in said relation to each other, that improvement in which said holder is made of a single piece of wire having one end thereof formed to extend through all of the openings of the wrenches at one end of said set and having an offset end formed to interlock with the uppermost wrench of the set, for holding the parts of the wrenches at one end of said set in substantially vertical alinement, said wire being bent to extend upwardly along one side of said set, over the uppermost wrench and downwardly along the other side of the set, and interlocking means at the other end of said wire which releasably engage with the opening in the other end of the lowermost wrench for holding said wrenches in superimposed relation to each other.

4. A wrench set including wrenches of gradually decreasing size from the lowest to the uppermost wrench, said wrenches having openings in opposite end portions thereof, and a holder for releasably securing said wrenches in said relation to each other, said holder being made of a single piece of wire bent intermediate of its ends to form two substantially parallel legs, said wire adjacent to said bent part being formed into the shape of a hook extending through the openings at one end of said set of wrenches, said wire beyond said hook extending upwardly along opposite sides of said wrench set toward the opposite end thereof, and means for securing the free ends of said wires to said wrench set to hold said wrenches in alined vertical relation to each other.

5. A wrench set including wrenches of gradually decreasing size from the lowest to the uppermost wrench, said wrenches having openings in opposite end portions thereof, and a holder for releasably securing said wrenches in said relation to each other, that improvement in which said holder is made of a single piece of wire having one end thereof bent to form a hook and extending upwardly through all of the openings in one end of said set of wrenches and gripping the uppermost of said wrenches, said wire beyond said hook extending along both sides of said wrench set, and means for securing and end of said wire to said wrench set to hold said wrenches substantially in vertical alinement with each other.

References Cited in the file of this patent

UNITED STATES PATENTS

| | | |
|---|---|---|
| 224,825 | Hatch | Feb. 24, 1880 |
| 837,383 | Carlton | Dec. 4, 1906 |
| 1,604,608 | Ryerson | Oct. 26, 1926 |
| 1,875,815 | Kneier | Sept. 6, 1932 |
| 1,877,466 | Koster | Sept. 13, 1932 |
| 1,900,915 | Costello | Mar. 14, 1933 |
| 1,917,409 | Vallone | July 11, 1933 |